Figure 1:
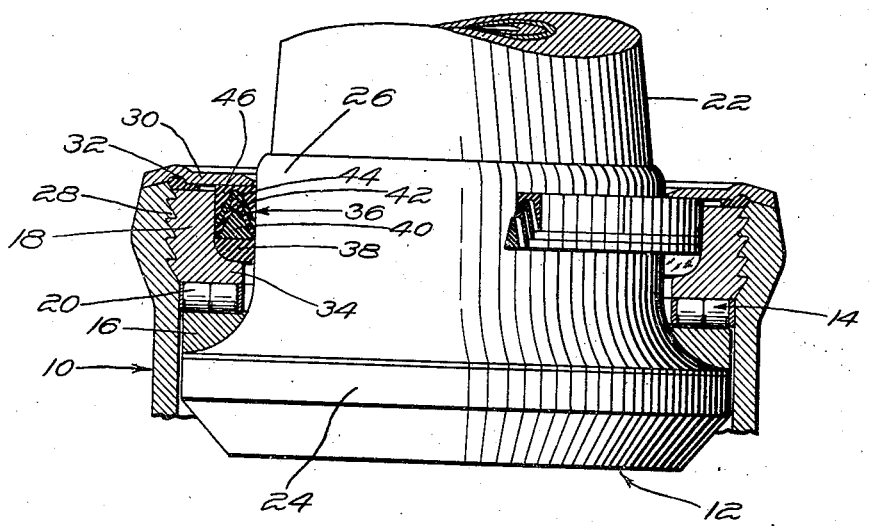

May 4, 1943.      W. S. HOOVER      2,318,486
PROPELLER BLADE PACKING
Filed April 16, 1940

INVENTOR
Walter Scott Hoover
BY
Harris G. Luther
ATTORNEY

Patented May 4, 1943

2,318,486

UNITED STATES PATENT OFFICE 2,318,486

PROPELLER BLADE PACKING

Walter Scott Hoover, Montreal, Quebec, Canada

Application April 16, 1940, Serial No. 329,921

4 Claims. (Cl. 286—26)

This invention relates to improvements in packing means and has particular reference to an improved lubricant sealing packing for a machine bearing.

An object of the invention resides in the provision of an improved packing of the character indicated formed of one or more continuous pieces of resilient material which may be stretched over an enlargement of a machine element and will fit closely about a reduced portion of the element at the operative position of the packing.

A further object resides in the provision of a continuous circular or annular packing for a machine element of irregular shape such as a propeller blade having enlargements at both sides of the bearing area, the packing being stretchable over at least one of such enlargements and being sufficiently resilient to closely surround and contact with the bearing area when brought to its operative position.

A still further object resides in the provision of an improved resilient continuous packing member of the character indicated which is highly impervious to the deteriorating effects of machine lubricants.

An additional object resides in the provision of an improved continuous resilient packing means of the character indicated so constructed and arranged that the pressure of lubricant acting against the packing means improves the seal between the packing means and the machine elements with which it is associated.

Other objects and advantages will be more particularly pointed out hereinafter or will become apparent as the description proceeds.

In the accompanying drawing, in which like reference numerals are used to designate similar parts throughout, there is illustrated a suitable arrangement for the purpose of disclosing the invention. The drawing, however, is for purposes of illustration only and is not to be taken as limiting the invention as it will be apparent to those skilled in the art that various changes in the illustrated arrangement may be resorted to without in any way exceeding the scope of the invention.

Figure 2:
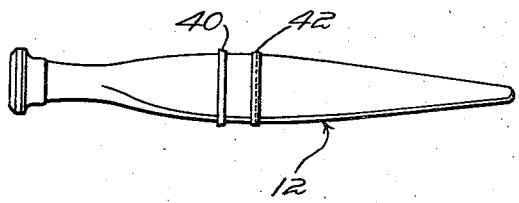

In the drawing,

Fig. 1 is a sectional view through a propeller blade bearing showing the application thereto of a resilient packing arranged according to the invention, and Fig. 2 is an elevational view of a propeller blade showing the manner in which the resilient packing is brought to its operative position on the bearing portion of the blade.

Referring to the drawing in detail, the numeral 10 generally indicates a retaining member such as the blade socket on a propeller hub and the numeral 12 generally indicates the root end of a propeller blade secured in the hub by a bearing generally indicated at 14 and including the race members 16 and 18 and the row of anti-friction elements represented by the rollers 20.

While a propeller blade mounting has been illustrated for the purpose of disclosing the improved packing means it is to be understood that the invention is in no way limited to this particular application but that the improved packing may be used to seal any machine bearing where its use is advantageous or desirable.

The bearing race 16 rests upon a fillet between the blade shank 22 and end flange 24, the fillet and the portion of the blade within the bearing 14 being enclosed in a suitable protective casing 26 of a non-metallic material such as a thermoplastic resin if desired. The outer race member 18 is secured in the socket 10 by suitable means, such as the buttress threads 28, and may be held in adjusted position in the socket by a suitable lock plate 30. If desired, the outer end of the thread 28 may be sealed by an annular member 32 of resilient material, such as rubber, compressed against the end of the socket and outer race by the locking plate 30, to prevent leakage of lubricant through the threads.

The outer race member 18 may be provided with an internal annular shoulder 34 providing one end of an annular space between the race member 18 and the blade shank or protective casing 26, the outer end of this space being closed by the inner portion of the locking plate 30.

The packing, generally indicated at 36, comprises a flat ring member 38 resting on the annular shoulder 34 and preferably formed of some non-metallic material such as graphited hard rubber, an annular soft rubber member 40 of generally wedge shaped cross-section, soft rubber annular members 42 and 44 of generally V shaped or chevron cross-section and an upper ring member 46 having in cross-section a generally rectangular outer contour and a V shaped groove fitting the outer chevron member 44 and formed preferably of graphited hard rubber material similar to that of which the ring 38 is formed. The soft members may be made of a resilient stretchable material such as ordinary soft rubber, but the synthetic rubber product known as "neoprene" has been found to be particularly advantageous because of its high resistance to the deteriorating effect of lubricating oil. Both rings 38 and 46 may be provided in two or more pieces so that they may be readily assembled about the surface to be sealed, the soft rubber members 40, 42 and 44, however, each being provided in a single continuous member and being sufficiently resilient so that they may be stretched over one enlarged end portion of the blade and brought to their operative position as illustrated in Fig. 1. While two members of V shaped or bifurcated cross-section, referred to as chevron pieces 42 and 44 have been illustrated it is to be understood that the invention is in no way limited to this particular number since as many such pieces may be used as may be found desirable or necessary.

The open sides of the members 42 and 44 are held separated by the spacing member 40 so that the bifurcate portions of these members are in contact with the opposed surfaces of the two machine elements between which the seal is installed and the open sides of the members are turned toward the interior or lubricant containing portion of the bearing so that pressure of the lubricant acting on the separating member 40 and the inner sides of the chevron members themselves will tend to increase the sealing pressure between these members and the surfaces of the machine elements to prevent the passage of lubricant between the seal and the surfaces.

Fig. 2 shows the manner of installing the flexible packing rings on a machine element or irregular shape, such as a propeller blade. As illustrated in this figure the separating member 40 has been started onto the airfoil end of the blade somewhat ahead of the first chevron member 42 and has been brought to the widest portion of the airfoil part of the blade, that is, has reached its condition of maximum stretch. The flexible parts of the packing are so constructed and formed of such a material that this maximum stretch does not result in any permanent stretch or distortion of the member so that when the member is brought to its operative position it will firmly embrace the portion of the machine element at that location. While the flexible members have been shown as assembled over the airfoil end of the blade it is obvious that they could be assembled over the flange end if desired, and would advantageously be assembled over whichever end necessitated the least stretch of the flexible elements.

While a particular arrangement has been hereinabove described and illustrated in the accompanying drawing for the purpose of disclosing the invention, it is to be understood that the invention is not limited to the arrangement so described and illustrated but that such changes in the form and material of the packing members may be resorted to as come within the scope of the sub-joined claims.

Having now described the invention so that others skilled in the art may clearly understand the same, what it is desired to secure by Letters Patent is as follows:

1. In combination with a machine element having a packing receiving portion and having portions at each side of said packing receiving portion larger than and permanently secured to said packing receiving portion, a lubricant seal packing comprising a plurality of continuous annular members of elastic material having a bifurcated cross-sectional form nested together, and a continuous annular member of elastic material having a substantially solid cross-section fitted into and substantially filling the space between the bifurcate portions of the open one of said nested members of bifurcated cross-sectional form.

2. The arrangement as set forth in claim 1 including a split supporting ring of relatively non-stretchable material for said member of substantially solid cross-section.

3. The arrangement as set forth in claim 1 including a split grooved ring of relatively non-stretchable material for receiving said nested plurality of members of bifurcated cross-sectional form.

4. The arrangement as set forth in claim 1 including, a split supporting ring of relatively non-stretchable material for said member of substantially solid cross-section, and a split grooved ring of relatively non-stretchable material for receiving said nested plurality of members of bifurcated cross-sectional form.

WALTER SCOTT HOOVER.